United States Patent Office.

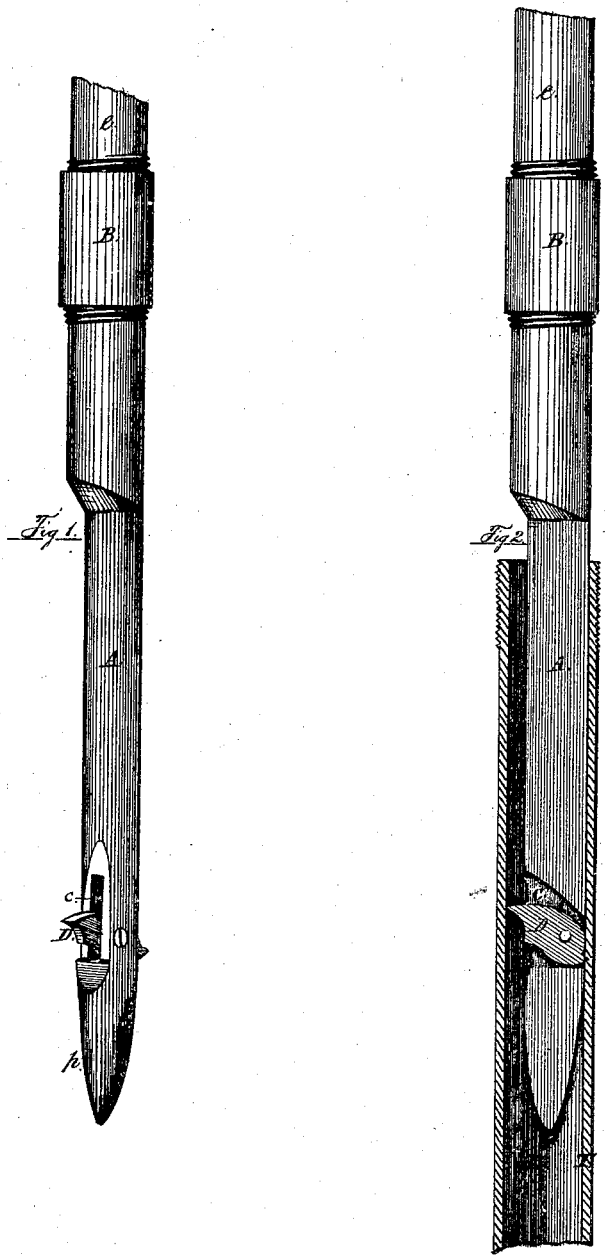

ISAAC S. PETERS, OF MARSHALL, MICHIGAN.

Letters Patent No. 111,146, dated January 24, 1871.

IMPROVEMENT IN TUBE-EXTRACTORS.

The Schedule referred to in these Letters Patent and making part of the same.

I, ISAAC S. PETERS, of the city of Marshall, in the county of Calhoun and State of Michigan, have invented an improved tool for drawing out tubes or other hollow bodies from their seats, which I denominate a Tube-Extractor, of which the following is a specification.

My invention relates to the combination, with a pointed bar, of one or more clutching-dogs, placed within a mortise or mortises made through the center of said bar, and pivoted thereto in such way that the dog will have a free, but limited, vibrating or oscillating motion on its pivot, the object being to readily and securely clutch or dog the interior of tubes, pipes, or other analogous forms, and extract the same, when necessary, from places inaccessible to ordinary tools.

My invention is embodied in the annexed drawing, making a part of this specification, in which—

Figure 1 is a side elevation of the tube-extractor, and broken section of the connected operating-pipe or rod.

Figure 2 exhibits the upper part of the same in elevation, and a central longitudinal section of its penetration within a broken section of the tube to be extracted.

I will first proceed to describe the construction of my tube-extractor when applied to the withdrawal of tubing from below the ground-surface.

A is the clutch-bar, pointed, as shown, at the lower end $p$, to facilitate its introduction into the bore of the lost tube-section.

B is a screw coupling-ring, by which the opposite end of the clutch-bar may be connected to sufficient length of tube-sections, $e$, to reach the lost section of the tube below ground.

C is a mortise, made centrally through the clutching-bar.

D is the clutching-dog, placed within the mortise, and pivoted, as shown, to the bar, so that said dog will vibrate on its pivot within a certain circumscribed arc.

This dog and the pin or pivot on which it works should both be of fine steel, and it is convenient to insert and secure the pivot so that it may be readily removed and replaced for changes of dogs to suit tubes of other calibers.

T represents a broken section of a point or tube supposed to be imbedded at some depth in the ground, within the bore, made in sinking the well-tubing.

The clutching-dog D is simply a flat-sided piece of steel, pivoted out of the center lengthwise, so as to act cam-like in jamming the clutching-bar against the side of the tube to be drawn; but in order to prevent this jamming action from springing such tube oval I form on the perimeter of the dog one or more chisel-projections of spurs, which bite into the metal of the tube when the clutching-bar is drawn back a very small distance.

Several of these dogs may be employed either on the same side, or alternately placed on opposite sides of the clutch-bar, to dog the tube at different points where a very great force is required for its extraction; but one alone is usually sufficient.

The *modus operandi* in extracting a lost tube from below ground is as follows:

The upper tubing being drawn out of the ground in any of the usual ways, the clutch-bar A, of a diameter less than the bore of the tube, and fitted with a dog, D, of suitable size, is coupled to the withdrawn tubing, or to suitable rods, and driven through the ground-bore until its pointed end enters the lost tube.

The clutching-dog is so pivoted within the mortise that said dog will vibrate within the body of the bar to accommodate itself to the bore of the tube as it enters, the pendulous gravity, or overbalance of the spur, causing it to bear in constant contact with the side of the tube.

The length of the dog from that side of the bar that bears against the tube to the spur-point being greater than the radius of the tube, it follows that the upward or other withdrawal-motion of the bar will, if the dog bears at the proper angle, cause the spur or spurs to sink into the tube, when it can readily be extracted.

I do not desire to confine myself to any special number of dogs, their form, or the arrangement of the spur or spurs they may carry, for these points will necessarily be determined by the peculiar circumstances of their use; and I will here state that, after the tube-section has been drawn out, the clutching-bar is readily detached by simply pushing it a little further within the recovered point or tube, which will liberate the spurs; then, by holding them upside down, the dog will so vibrate within the mortise as to allow the bar to be drawn out.

The lost perforated point-sections, so often broken off below ground by jamming among stones, while constructing "driven-wells," can quickly be recovered by the use of my tube-extractor.

But besides this and analogous uses, it may be employed to very great advantage in withdrawing tubes from steam-boilers, furnaces, &c; but where the pull is downward the position of the dog must be reversed in the bar, and for these uses a pointed end may usually be dispensed with.

I claim as my invention—

An implement for extracting tubes from wells, consisting of the dog D and bar A, when the dog is eccentrically pivoted, and projects at both sides of the bar, being provided at each end with a spur which enters the metal, substantially as herein described.

ISAAC S. PETERS.

Witnesses:
C. C. DODGE,
SILAS PETERS.